(12) United States Patent
Crispin

(10) Patent No.: US 12,517,341 B2
(45) Date of Patent: Jan. 6, 2026

(54) SEALED REFLECTING SIGHT WITH LOW PROFILE CARRIER ASSEMBLY

(71) Applicant: Leupold & Stevens, Inc., Beaverton, OR (US)

(72) Inventor: Quint Dean Crispin, Beaverton, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 406 days.

(21) Appl. No.: 18/077,954

(22) Filed: Dec. 8, 2022

(65) Prior Publication Data
US 2023/0185074 A1     Jun. 15, 2023

Related U.S. Application Data

(60) Provisional application No. 63/287,553, filed on Dec. 9, 2021.

(51) Int. Cl.
  *G02B 23/16* (2006.01)
  *F41G 1/34* (2006.01)
  *G02B 27/34* (2006.01)

(52) U.S. Cl.
  CPC ............ *G02B 23/16* (2013.01); *F41G 1/345* (2013.01); *G02B 27/34* (2013.01)

(58) Field of Classification Search
  CPC ........ G02B 23/16; G02B 27/34; G02B 23/00; G02B 23/14; G02B 27/32; G02B 27/36; F41G 1/345; F41G 1/00; F41G 1/01; F41G 1/027; F41G 1/06; F41G 1/08; F41G 1/10; F41G 1/12; F41G 1/14; F41G 1/32; F41G 1/34; F41G 1/38; F41G 1/387; F41G 1/42;
  (Continued)

(56) References Cited

U.S. PATENT DOCUMENTS

| 5,625,954 A * | 5/1997 | DePaoli | ................. F41G 1/345 |
|  |  |  | 42/126 |
| 8,966,805 B2 * | 3/2015 | Koesler | ..................... F41G 1/30 |
|  |  |  | 42/111 |
| 9,453,706 B1 | 9/2016 | Crispin |  |

(Continued)

OTHER PUBLICATIONS

United States International Search Authority, International Search Report and Written Opinion of the International Searching Authority in PCT/US2022/052304, mailed Sep. 28, 2023, 9 pages.

*Primary Examiner* — Arnel C Lavarias

(74) *Attorney, Agent, or Firm* — Schwabe, Williamson & Wyatt, P.C.

(57) ABSTRACT

An optic assembly may include: an environmentally isolated cavity defined by at least a front lens and a housing; a light source located inside the environmentally isolated cavity, the light source to project a reticle on the front lens; and a carrier assembly located inside the environmentally isolated cavity, wherein the light source is mounted on a carrier of the carrier assembly, and the carrier assembly includes: at least one boss fixably located with respect to a bottom interior surface of the environmentally isolated cavity; and a carrier lift slidingly movable along the at least one boss to raise or lower the light source relative to the front lens; wherein the carrier is slidably movable relative to the carrier lift to laterally adjust a position of the light source relative to the front lens. Other embodiments may be disclosed and/or claimed.

24 Claims, 11 Drawing Sheets

(58) Field of Classification Search
CPC ............ F41G 1/425; F41G 1/46; F41G 1/467; F41G 11/00; F41G 11/001
USPC ....... 359/428, 362, 399, 423, 424, 429, 434; 42/111, 113, 114, 115, 119, 120, 122, 42/123, 124, 125, 126, 130, 131, 135, 42/136, 137
See application file for complete search history.

(56) References Cited

U.S. PATENT DOCUMENTS

| | | | |
|---|---|---|---|
| 11,761,816 B2* | 9/2023 | Sabaldan Elpedes . | H05B 47/11 362/23.19 |
| 2014/0237884 A1 | 8/2014 | Koesler et al. | |
| 2017/0205194 A1* | 7/2017 | Teetzel ..................... | F41G 1/26 |
| 2018/0195835 A1* | 7/2018 | Crispin .................... | F41G 1/30 |
| 2019/0120594 A1 | 4/2019 | Teetzel et al. | |
| 2020/0240748 A1 | 7/2020 | Connolly | |
| 2021/0157267 A1 | 5/2021 | Heath et al. | |

* cited by examiner

SEALED REFLECTING SIGHT WITH LOW PROFILE CARRIER ASSEMBLY

RELATED APPLICATION

This application is a non-provisional of and claims priority benefit to U.S. provisional application Ser. No. 63/287,553, filed on Dec. 9, 2021, which is incorporated by reference herein in its entirety.

TECHNICAL FIELD

The present disclosure relates to reflecting sights for pistols, long guns, crossbows, and the like.

BACKGROUND

Miniature reflex sights, also known as mini red-dot sights, are non-magnifying reflector sights commonly used with pistols and small armaments such as long guns and crossbows. When mounted on a pistol, the body of the reflex sight may obscure factory iron sights. This leaves many users struggling to align either sight to their eye.

One partial solution is to install taller suppressor-height iron sights that can be seen through the optical path of the reflex sight, known as co-witnessing. Another partial solution is to use a sight configured so the electronics and battery are behind the pistol rather than above the slide (e.g., the Leupold® Deltapoint Micro™). With the electronics and battery behind the pistol, the optical path is low enough to cowitness with factory iron sights. Disadvantages of this optic are that it increases the overall length of the pistol and is incompatible with an external hammer.

Another way to cowitness with iron sights is to recess part of the pistol slide. Then, if the reflex sight has a thin body like the Shield RMSc, it can mount low enough to reveal part of the factory iron sights. However, this configuration may be sensitive to debris. The front lens of most reflex sights may reflect light from a Light Emitting Diode (LED) at the rear of the sight. Thus, if anything comes between the LED and the lens, no dot will appear. Also, any moisture or debris on the inside of the lens may impede function of the sight. Products like the Aimpoint® ACRO fully enclose the optical path to prevent this, but even with a recessed pistol slide, are too tall to cowitness with factory iron sights.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 1:
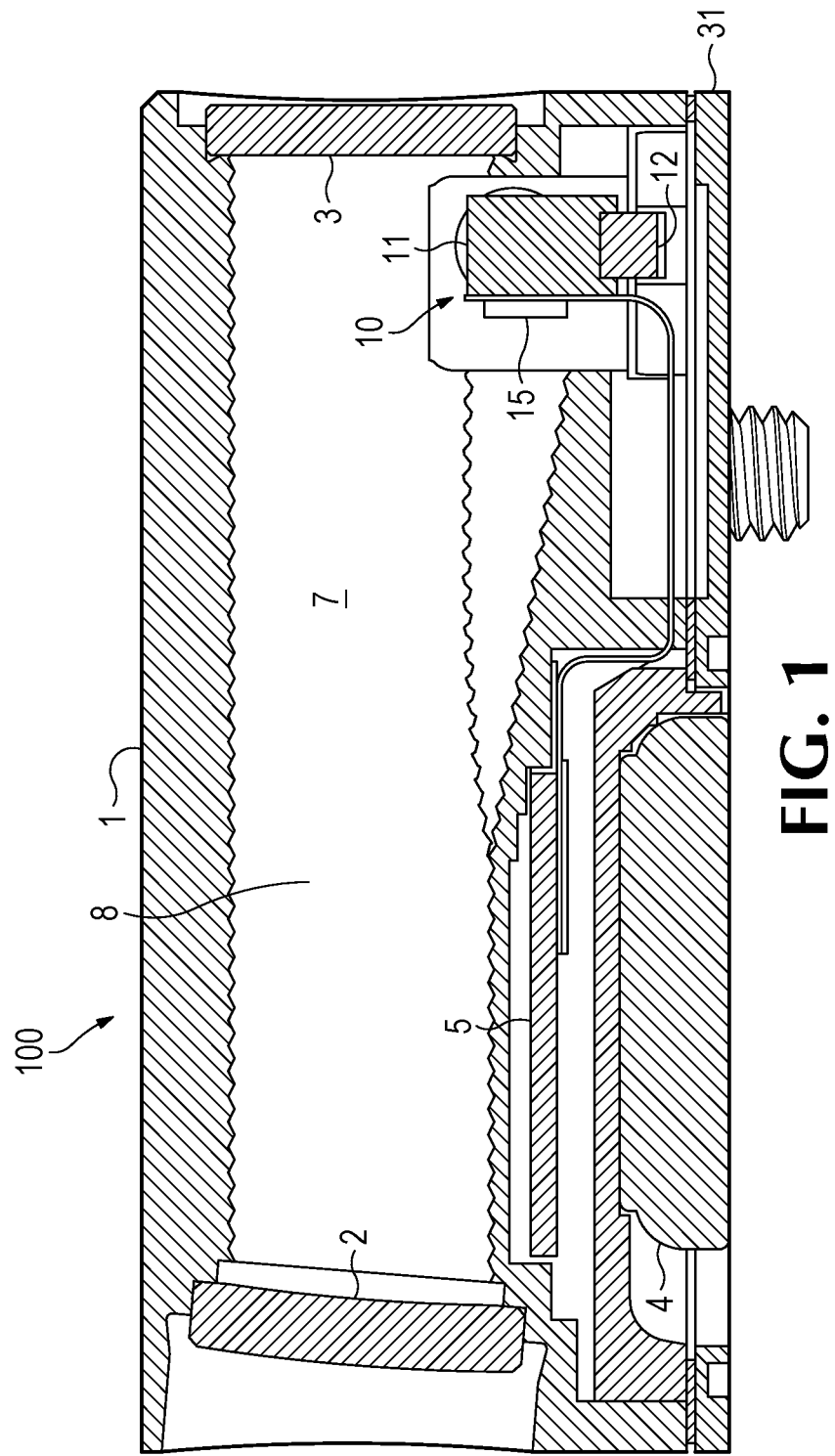
FIG. 1 illustrates a vertical cross-section of a center length of an optic assembly, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Various embodiments described herein may include a reflex sight that is sealed against debris and sufficiently compact to cowitness the factory iron sights of a pistol. Also, in various embodiments, the reflex sight may not increase the total length of the pistol. Other embodiments described herein may include a compact sealed optic assembly usable for long guns, crossbows, and the like.

FIG. 1 illustrates a vertical cross-section of a center length of an optic assembly 100, according to various embodiments. The optic assembly 100 defines an environmentally isolated cavity 7 (e.g., a closed system or some other system that may be isolated from threshold contaminants). Light generated by the light source 15 may project a reticle 99 (FIG. 9) on a front lens 2. The closed system provided by the environmentally isolated cavity 7 may prevent contaminants (e.g., dust, moisture, or the like) from obscuring the projection onto the front lens 2.

Figure 8A:
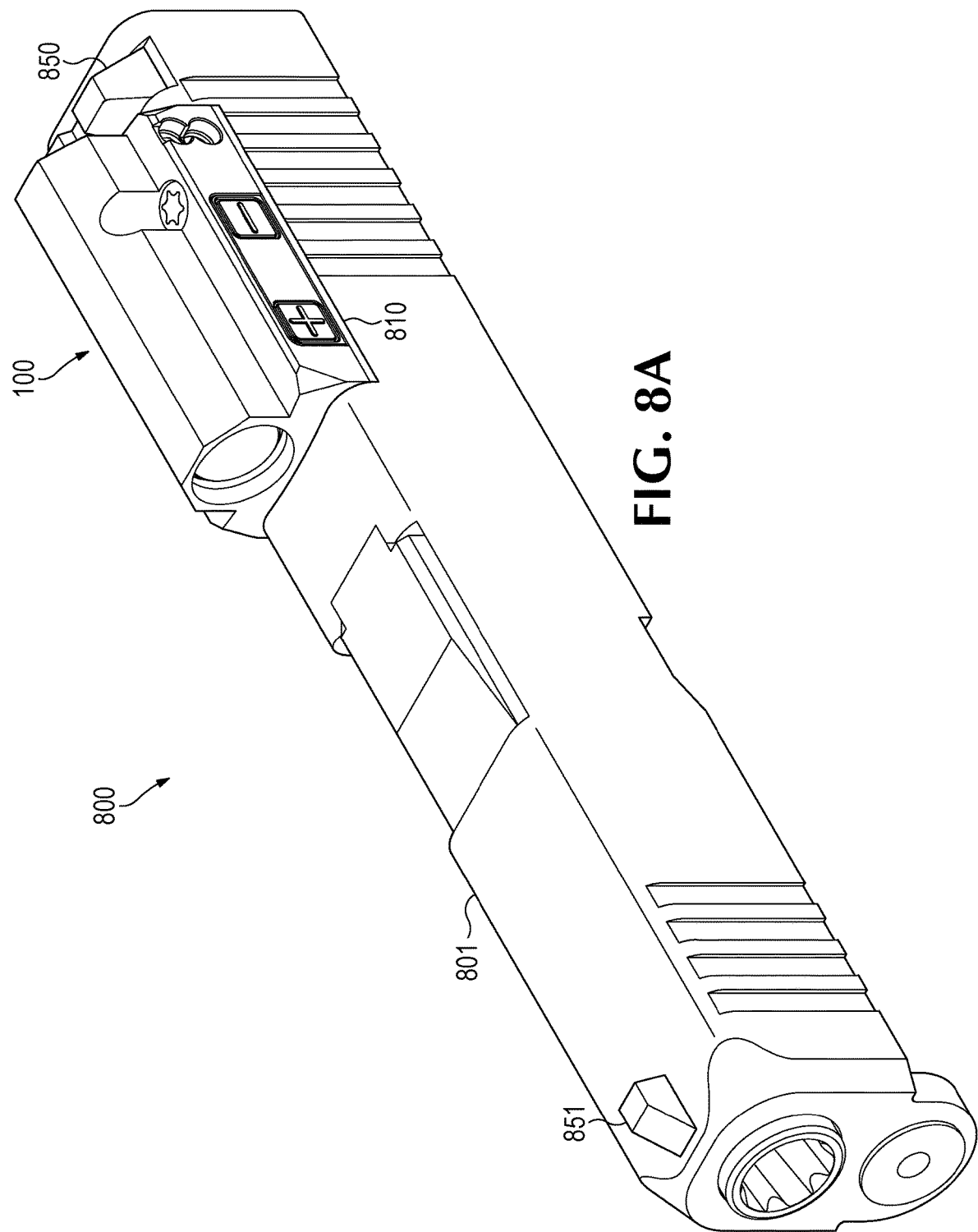
FIGS. 8A and 8B illustrate left and right side isometric views of a firearm assembly including the optic assembly of FIG. 1, according to various embodiments.
Figure 9:
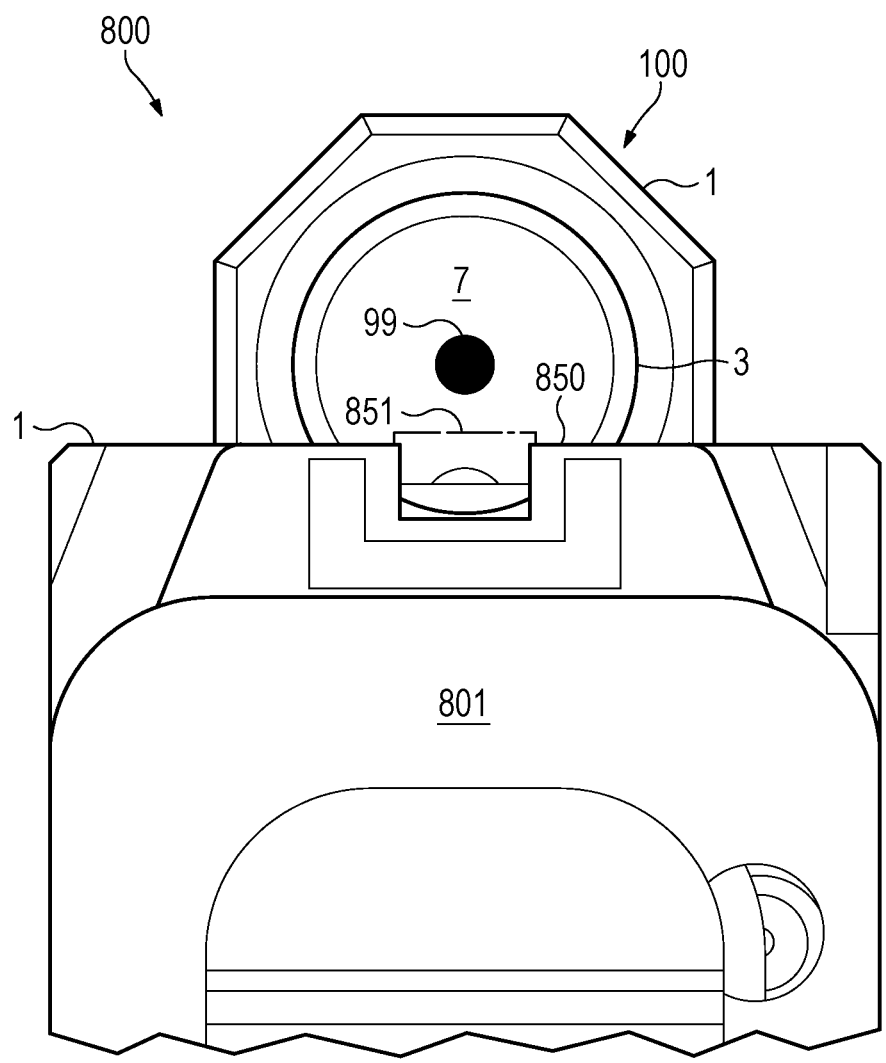
FIG. 9 illustrates a rear view of the firearm assembly of FIGS. 8A-B.

The optic assembly 100 provides an optical path 8 from the rear window 3 to the front lens 2, which allows cowitnessing of the reticle and iron sights of a pistol on which the optical assembly 100 is installed. Referring now to FIG. 8A and FIG. 9 in combination, at least part of the front sight 851 is alignably viewable with the rear sight 850 through the optic assembly 100 (cowitnessing). FIG. 9 in particular shows that a line of sight from a top of the front sight 851 to a top of the rear sight 850 is unobscured by the internal components of the optic assembly 100.

Referring to FIG. 8A, the optic assembly 100 does not increase the total length of the firearm assembly 800 because the entire profile of the optic assembly 100 is located over the slide 801 (in contrast to some optic assemblies that may locate a power source for a light source behind the slide, which adds to the total length of a firearm). Referring again to FIG. 1, the battery 4 and the control circuitry 5 are located in front of the light source 15.

Still referring to FIG. 1, the light source 15 is mounted on a carrier assembly 10, which can move the light source 15 up and down, and left and right, relative to the front lens 2. This allows a position of the reticle 99 (FIG. 9) to be moved to compensate for elevation or windage.

The carrier assembly 10 has a low total height located below the optical path 8 through the optic assembly 100. The low total height allows the cowitnessing of the iron sights through the optic assembly 100. The carrier assembly 10 includes a carrier 11, on which the light source 15 is mounted, and a carrier lift 12. The carrier 11 may be slidingly moved relative to the carrier lift 12, to allow movement of the reticle 99 (FIG. 9) left or right. The carrier lift 12 may change an elevation of the carrier 11 to allow movement of the reticle 99 (FIG. 9) up or down.

Figure 2A:
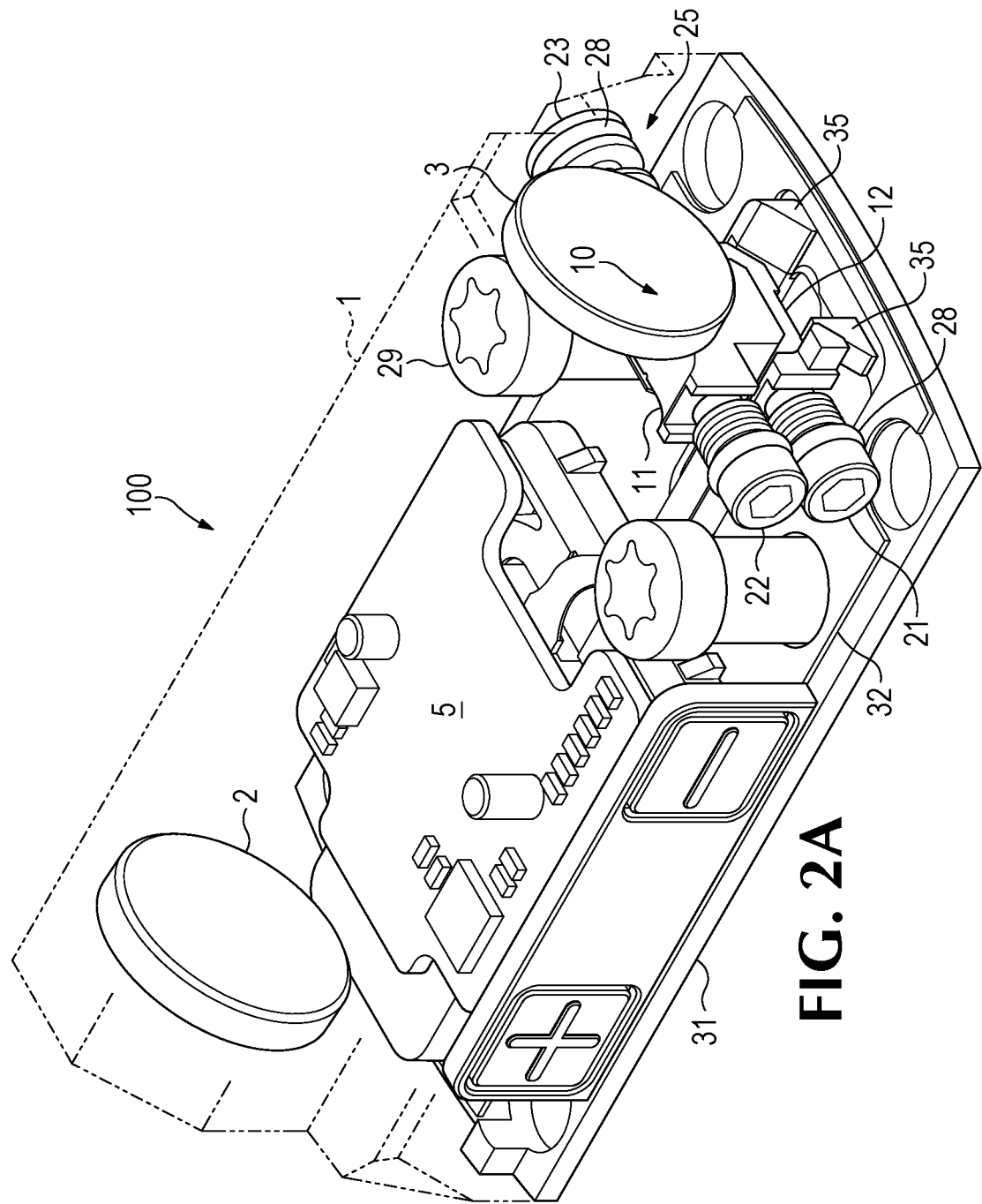
FIG. 2A illustrates an isometric view of an upper left side of the optic assembly of FIG. 1, in which the housing is shown in cutaway.
Figure 2B:
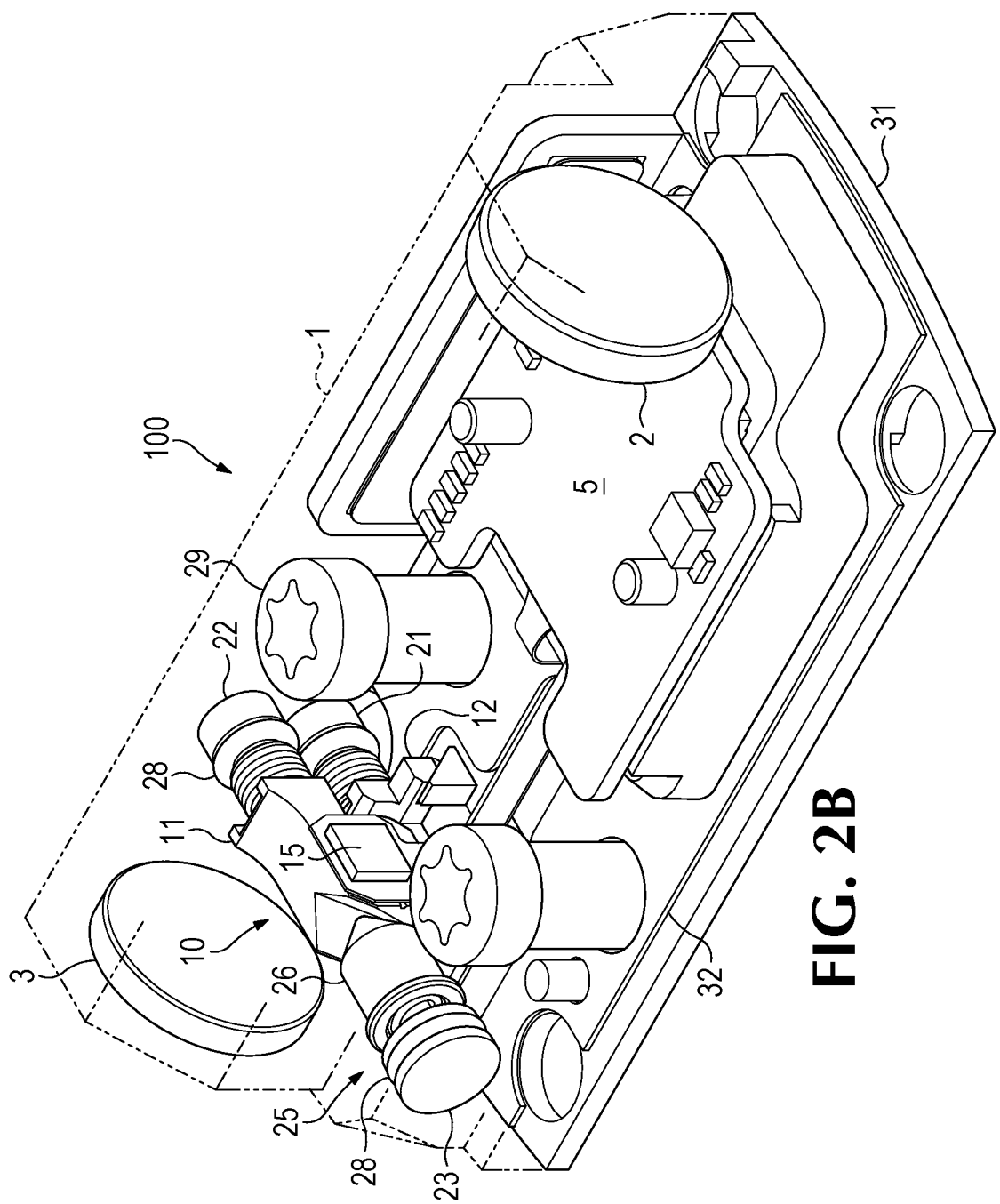
FIG. 2B illustrates an isometric view of an upper right side of the optic assembly of FIG. 1, in which the housing is shown in cutaway.

FIG. 2A illustrates an isometric view of an upper left side of the optic assembly 100 of FIG. 1, in which the housing 1 is shown in cutaway. FIG. 2B illustrates an isometric view of an upper right side of the optic assembly of FIG. 1, in which the housing 1 is shown in cutaway. Referring to FIG. 2A, an adjustment mechanism 22 (e.g., a windage screw) may be arranged to drive movement of the carrier 11, and an adjustment mechanism 21 (e.g., an elevation screw) may be arranged to drive movement of the carrier lift 12 (to raise or lower the carrier 11).

The illustrated adjustment mechanisms 21 and 22 both enter from a side of the optical assembly 100 (e.g., the same side), below the optical path 8 (FIG. 1), so they do not obscure visibility of a front sight. However, entering from the same side (and/or drivable along parallel axes, as illustrated) may not be required in other embodiments.

The illustrated adjustment mechanisms 21 and 22 are mounted through holes in the housing 1, and each have an end located external to the environmentally isolated cavity (which may include a head, as illustrated) and an end located within the environmentally isolated cavity (which may include a face, as illustrated). Seals 28 may prevent moisture (and/or other contaminants) from entering the environmentally isolated cavity through these holes and/or along lengths of the adjustment mechanisms 21 and 22.

In this example, the adjustment mechanisms 21 and 22 are threaded screws—rotatably drivable to move the carrier 11 and the carrier lift 12. A hex socket is provided on the external ends of the rotatably drivable adjustment mechanisms 21 and 22 (but any male or female structure to mate with a rotation tool may be used in other examples). In other embodiments, it may be practical and possible to use adjustment mechanisms drivable without rotation/threading.

Referring now to FIG. 2B, a spring assembly 25 may contact the carrier 11 to urge it against the end of the adjustment mechanism 22. The spring assembly 25 may include a plunger 26 with a back end having a cavity to receive one end of the spring, and a compression pin 23 to receive the other end of the spring. The front end of the plunger 26 may be sloped, so that the carrier 11 is urged downward, in addition to being urged against the end of the adjustment mechanism 22. In this embodiment, the seal 28 is provided around part of a head of the compression pin 23.

Referring now to FIGS. 2A and 2B in combination, the fasteners 29 may affix the optic assembly 100 to a slide of a pistol. Although an optic assembly 100 for mounting to a pistol is illustrated, it should be appreciated that any of the features of the optic assembly 100 may be utilized to provide compact optic assemblies for long guns, crossbows, and the like.

Figure 3:
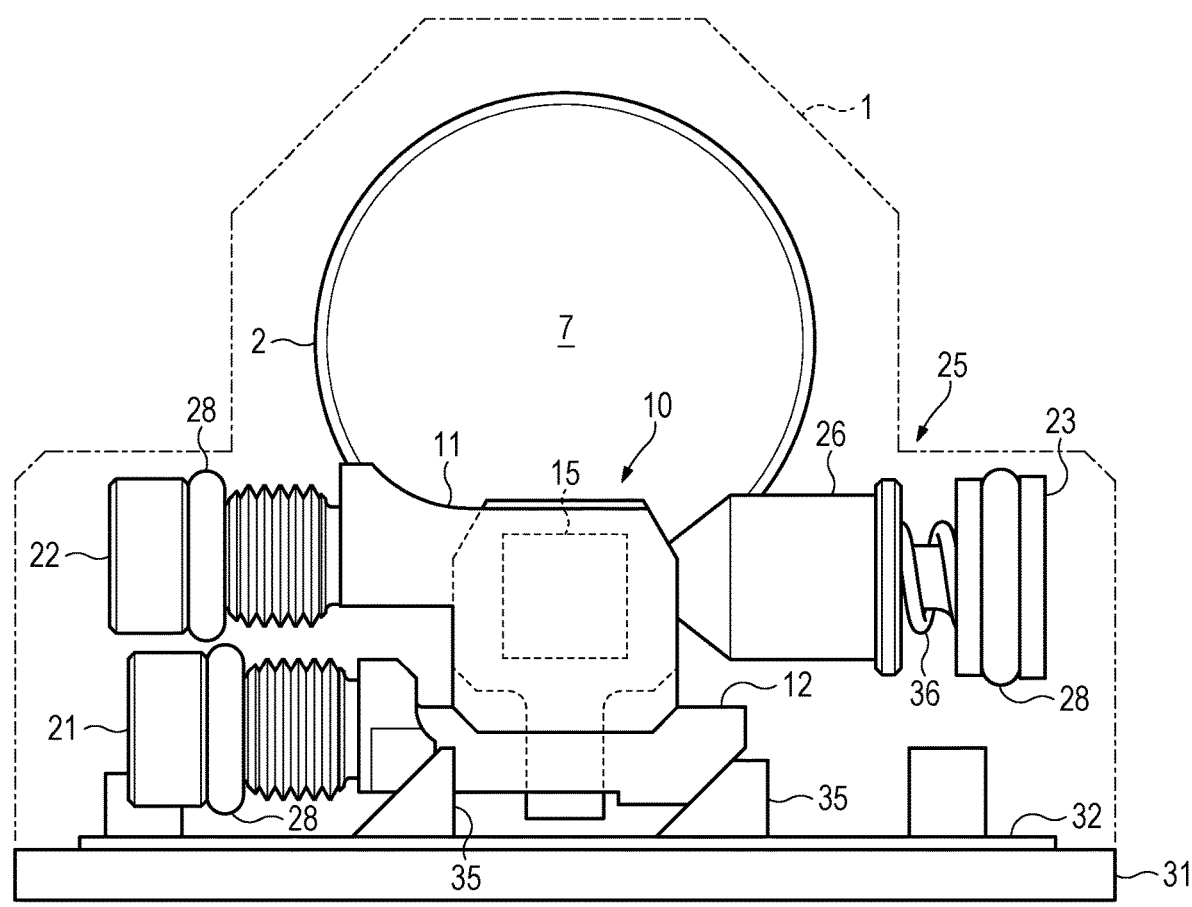
FIG. 3 illustrates the carrier assembly of the optic assembly of FIG. 1.

FIG. 3 illustrates the carrier assembly 10 of the optic assembly 100 of FIG. 1. The optic assembly 100 includes bosses 35 on a base plate 31 of the optic assembly 100. The bosses 35 have a fixed position relative to a bottom interior surface defined by the base plate 31, e.g., may be affixed to the base plate 31, or may be an integral part of the base plate 31 in other examples.

The carrier lift 12 is located on the bosses 35, and is slidingly movable relative to the bosses 35. Thus, when the end of the adjustment mechanism 21 is driven forward, the carrier lift 12 increases the elevation of the carrier 11. Likewise, since the plunger 26 may have a sloped front end and downward force may be applied when the spring 36 is partially collapsed, the carrier lift 12 may slide down the bosses 35 (when the end of the adjustment mechanism is driven backward) to decrease an elevation of the carrier 11. The spring 36 is a coil spring in this example, but other examples may use any type of wire spring (or other component that may generate a spring force, such as a compressible material, e.g., elastic). A gasket 32 may be located around the carrier assembly 100, as shown in more detail in FIG. 4.

In various embodiments, contact between the adjustment mechanisms 21 and 22, the carrier 11, the carrier lift 12, and plunger 26 may be slotted and/or wedged. This may keep these components together during recoil (or adjustment).

In this example, the bosses 35 and the carrier lift 12 both have sloped surfaces; however, this is not required. In other examples, one of the bosses 35 or the carrier lift 12 may have an angled face and the other of the bosses 35 or the carrier lift 12 may have a pin. In these examples, the pin may make relative movement, slidingly, with respect to the angled face.

In this example, the illustrated angled face (e.g., a ramp) is approximately forty-five degrees. However, in other examples, steeper or shallower angled faces (e.g., ramps or an angled face on the carrier lift 12) may be provided.

In this examples, the illustrated sloped surfaces have linear slopes; however, this is not required. In other examples, at least one sloped surface with a non-linear slope may be provided, such as a curved slope (e.g., a radius or other curved slope).

Figure 4:
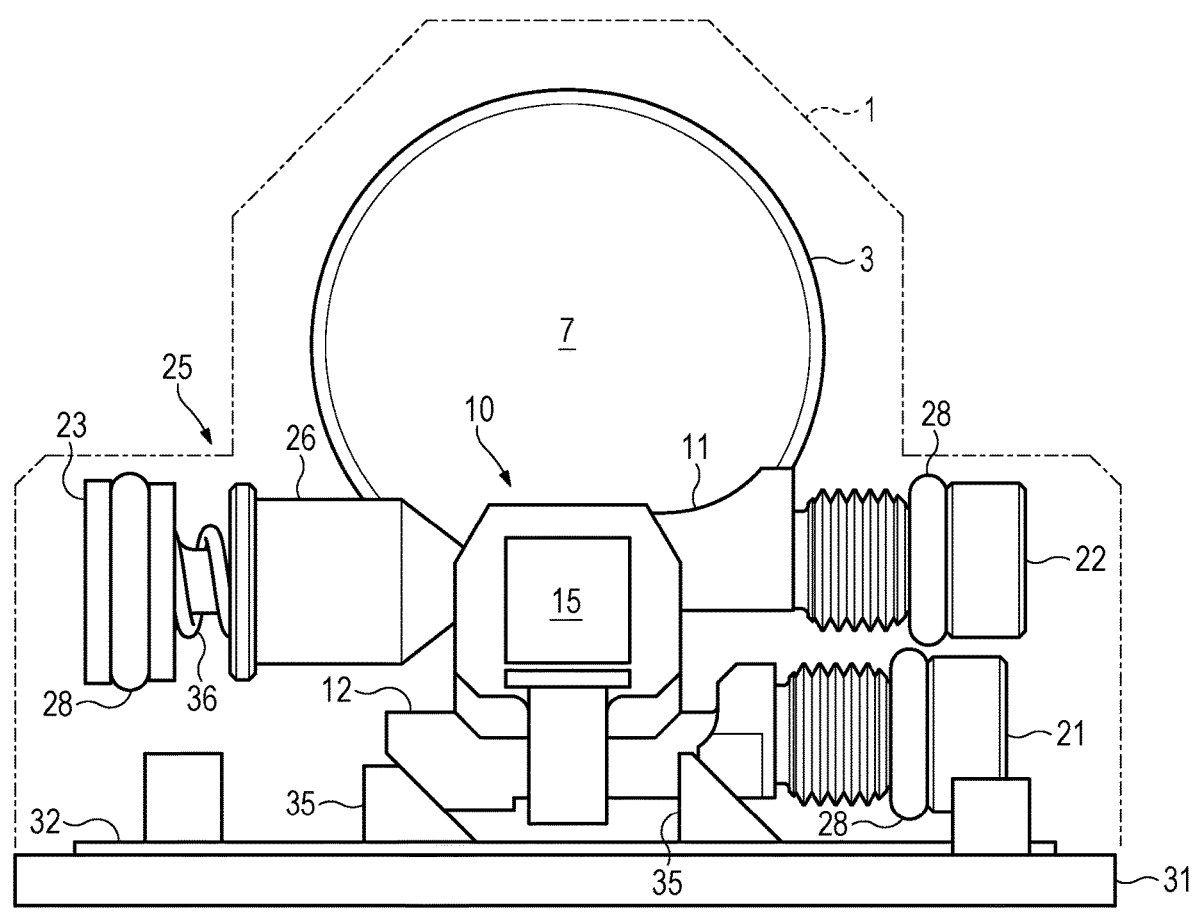
FIG. 4 illustrates a vertical cross-section of a width of the optic assembly of FIG. 1.
Figure 5A:
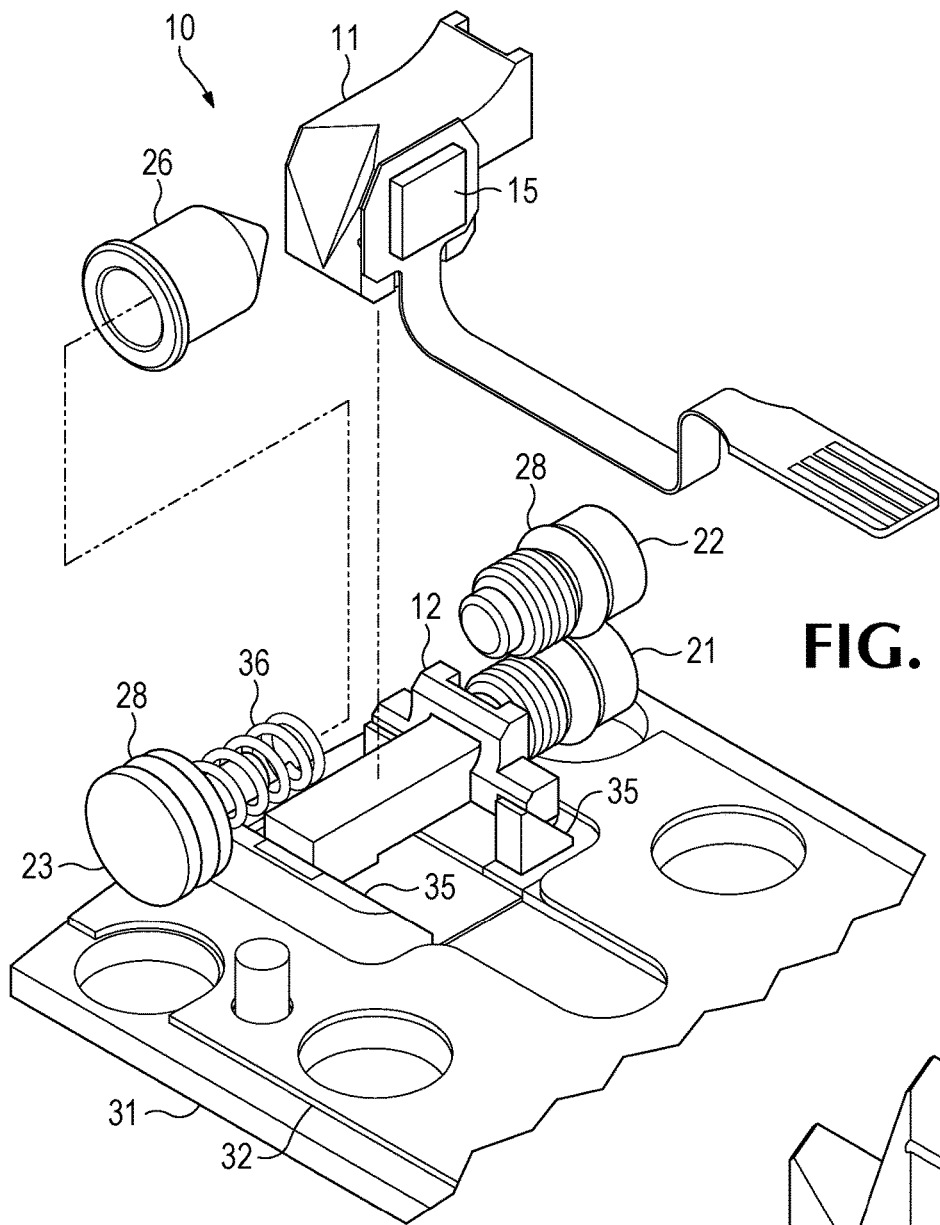
FIG. 5A illustrates a partially exploded isometric view of the carrier assembly of the optic assembly of FIG. 1, in which the housing is removed.

FIG. 4 illustrates a vertical cross-section of a width of the optic assembly 100 of FIG. 1. FIG. 5A illustrates a partially exploded isometric view of the carrier assembly 10 of the optic assembly 100 of FIG. 1, in which the housing 1 (FIG. 1) is removed. Three bosses 35 are shown in FIG. 5; however, in other embodiments any suitable number of bosses may be included.

Figure 5B:
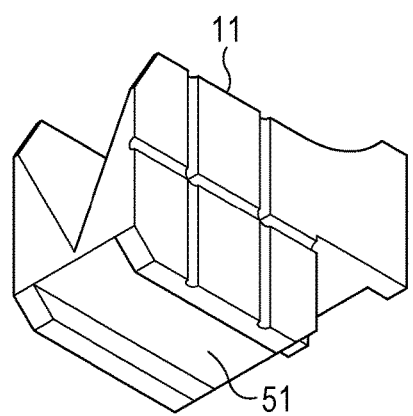
FIG. 5B illustrates an isometric view showing an underside of the carrier of FIG. 5A.

FIG. 5B illustrates an isometric view showing an underside of the carrier 11 of FIG. 5A. The carrier 11 is slotted on its underside. A slot 51 includes a channel to receive (e.g., mate) with a top of the carrier lift 12. The channel 51 may restrict movement of the carrier 11 relative to the carrier lift 12 (it may allow lateral movement while minimizing movement along a perpendicular axis, e.g., for/aft movement, as desired based on a tightness of the fitting of the top of the carrier lift 12 in the channel 51, e.g., based on a width of the channel compared to a width of the top of the carrier lift 12).

As mentioned earlier in the description of FIG. 3, contact between the adjustment mechanisms 21 and 22 (FIG. 3), the carrier 11 (FIG. 3), the carrier lift 12 (FIG. 3), and plunger 26 (FIG. 3) may be slotted (e.g., similar to the slotting described with reference to FIG. 5B) and/or wedged. In various embodiments, any of these components may be dovetailed together. For instance, a dovetail channel, e.g., a dovetail groove, may be used in place of the channel 51—with a mating dovetail interface on the carrier lift 12.

In the illustrated embodiment of FIG. 2A, the ends of the adjustment mechanisms 21 and 22 are located in channels defined by the carrier 11 and the carrier lift 12, respectively. Also, referring to FIG. 2B, the tapered end (e.g., a conical projection) of the plunger 26 is slottingly received by a V-shaped channel defined by the carrier 11. Also, the other end of the plunger 26 includes a cavity to receive an end of the compression pin 23. In various embodiments, any other slotting and/or wedging interface may be used between any of these components (such as a dovetail interface).

Figure 6:
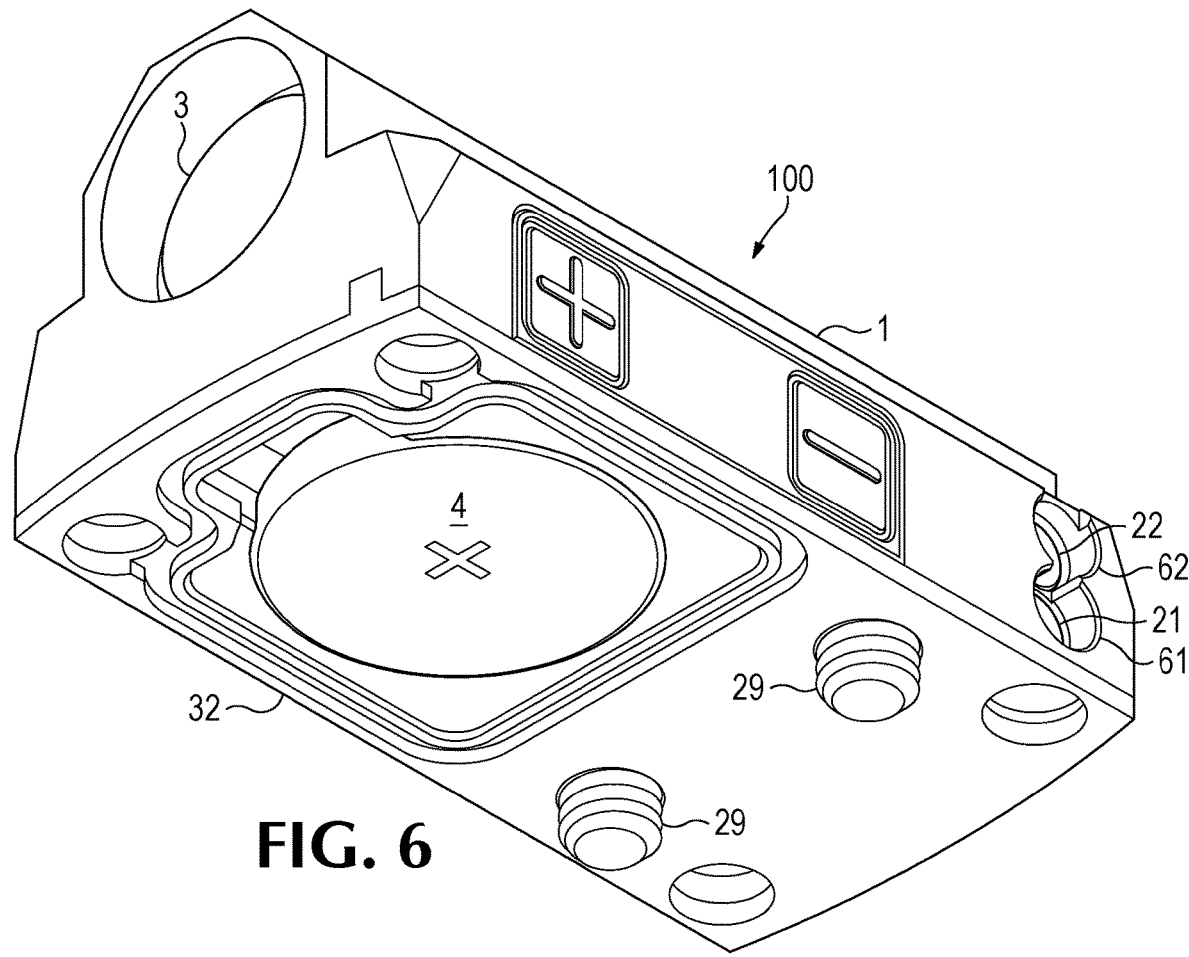
FIG. 6 illustrates a bottom isometric view of an exterior of the optic assembly of FIG. 1.
Figure 7A:
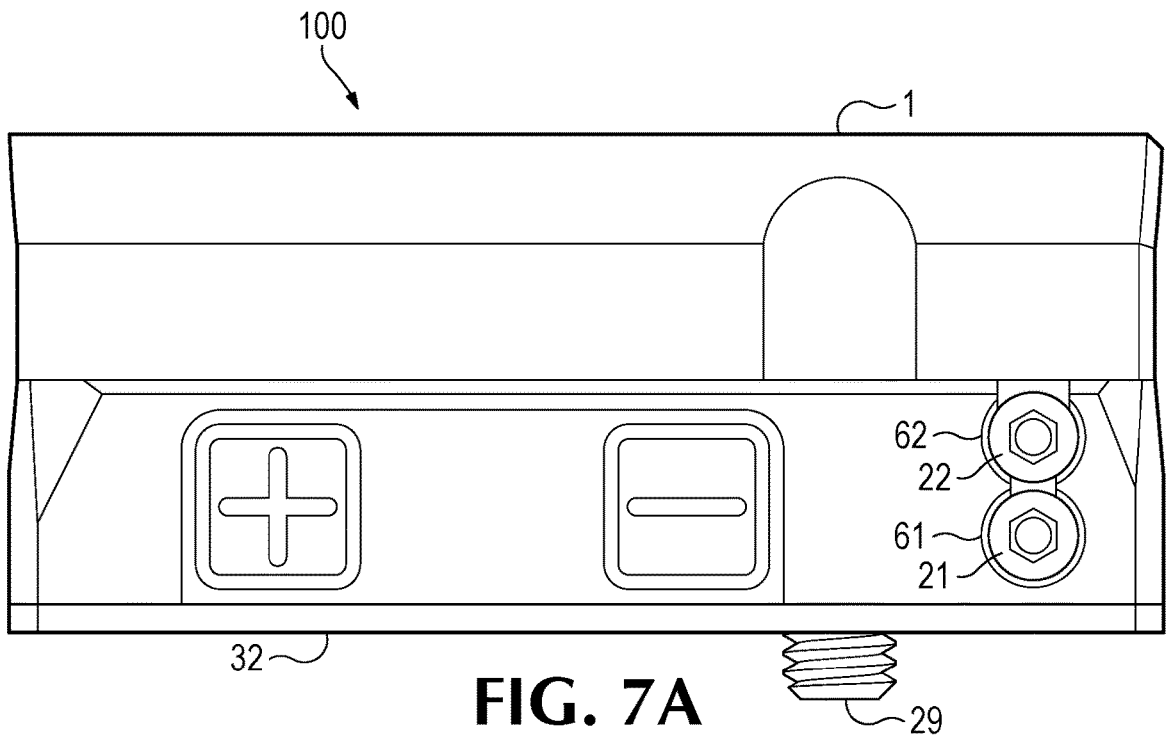
FIGS. 7A and 7B illustrate side views of an exterior of the optic assembly of FIG. 1.
Figure 7B:
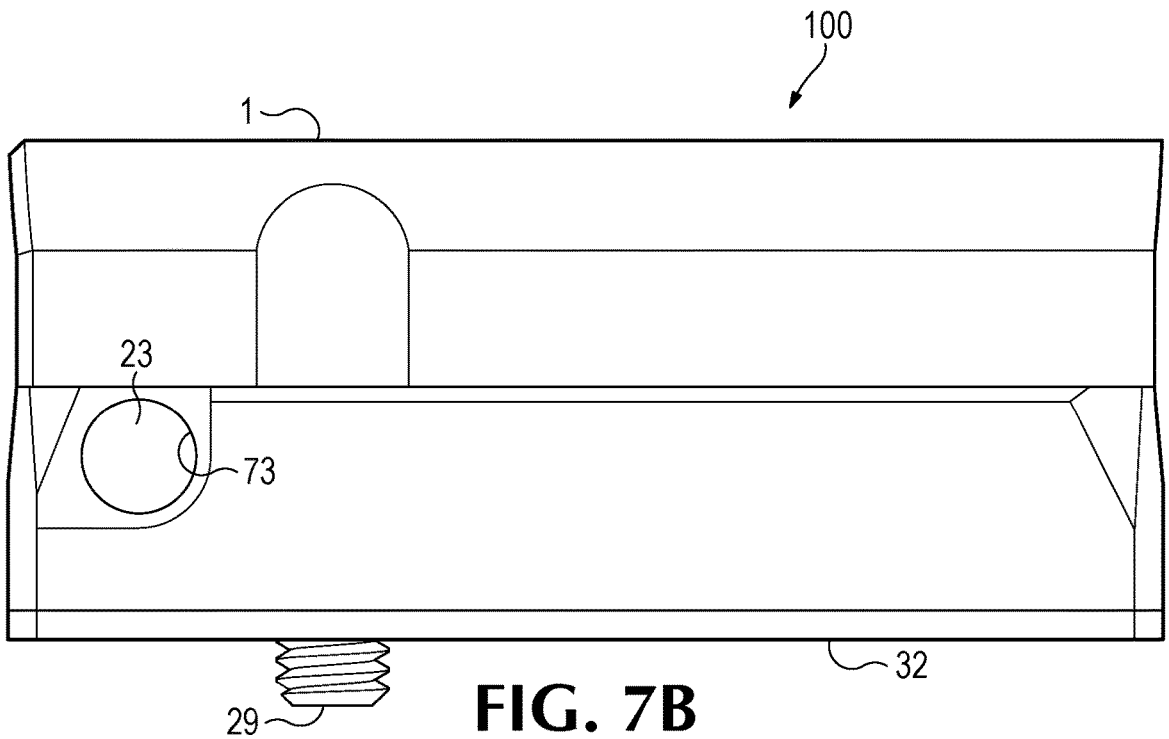
Figure 8B:
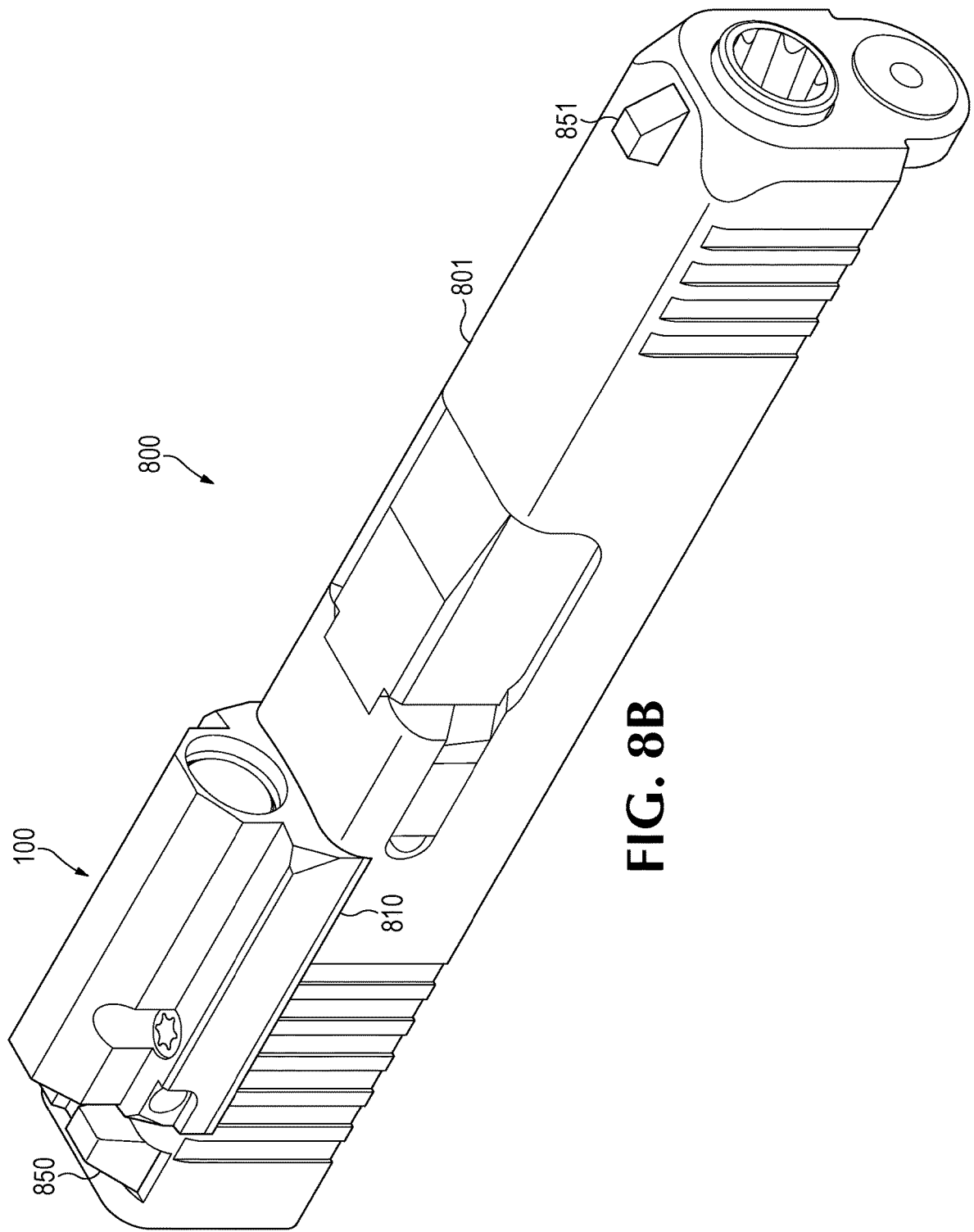

FIG. 6 illustrates a bottom isometric view of an exterior of the optic assembly 100 of FIG. 1. FIGS. 7A and 7B illustrate side views of an exterior of the optic assembly 100 of FIG. 1. FIGS. 8A and 8B illustrate left and right side isometric views of a firearm assembly 800 including the optic assembly 100 of FIG. 1, according to various embodiments. Referring to FIGS. 6 and 7B, the housing 1 defines openings 61 and 62 in which the heads of the adjustment mechanisms 21 and 22 are located, respectively. Also, the housing defines an opening 73 in which the head of the compression pin 23 is located.

FIG. 9 illustrates a rear view of the firearm assembly 800 of FIGS. 8A-B. The optic assembly 100 provides cowitnessing of the reticle 99 with another sight, e.g., the OEM (original equipment manufacturer) height iron sights (including rear sight 850 and front sight 851).

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An optic assembly, comprising:
an environmentally isolated cavity defined by at least a front lens and a housing;
a light source located inside the environmentally isolated cavity, the light source to project a reticle on the front lens; and
a carrier assembly located inside the environmentally isolated cavity, wherein a portion of the carrier assembly is positioned underneath a point along a co-witness line of sight and no portion of the optic assembly is located between said portion of the carrier assembly and said point;
the co-witness line of sight corresponding to at least one mechanical sight viewable through said at least the front lens;
wherein the light source is mounted on a carrier of the carrier assembly, and the carrier assembly includes:
at least one boss fixably located with respect to a bottom interior surface of the environmentally isolated cavity; and
a carrier lift including a first surface slidingly movable with respect to the at least one boss to raise or lower the light source relative to the front lens;
wherein the carrier is slidably movable relative to a second surface of the carrier lift to laterally adjust a position of the light source relative to the front lens.

2. The optic assembly of claim 1, wherein the at least one boss comprises a ramp.

3. The optic assembly of claim 1, further comprising an angled face on the at least one boss or the first surface of the carrier lift, wherein the angled face has a linear or non-linear slope.

4. The optic assembly of claim 1, wherein the environmentally isolated cavity is further defined by a rear window, wherein the reticle is viewable through the rear window.

5. The optic assembly of claim 4, wherein the optic assembly is mountable on a slide having sights to cowitness the reticle and one of the sights through the rear window.

6. The optic assembly of claim 1, wherein the optic assembly further comprises a power source for the light source, wherein the power source is located in front of the light source in the optic assembly.

7. The optic assembly of claim 1, further comprising:
means for externally driving, with respect to the environmentally isolated cavity, sliding movement of the carrier relative to the carrier lift; and
means for externally driving, with respect to the environmentally isolated cavity, slidingly movement of the carrier lift along the at least one boss.

8. The optic assembly of claim 1, wherein each of the externally driving means have first ends located inside the environmentally isolated cavity and second ends located outside the environmentally isolated cavity, wherein the second ends are located on a same side of the housing.

9. The optic assembly of claim 1, further comprising seals located around the driving means, respectively.

10. The optic assembly of claim 1, wherein the environmentally isolated cavity includes openings for:
a windage screw having a head with a rotatable driving means and a face to make contact with a side of the carrier to drive sliding movement of the carrier relative to the carrier lift; and
an elevation screw having a head and a face to make contact with the carrier lift and drive slidingly movement of the carrier lift along the at least one boss.

11. The optic assembly of claim 10, wherein the head of the windage screw comprises a first terminal end of the windage screw, the optic assembly further comprising means for urging the carrier against a second terminal end of the windage screw, the second terminal end opposite the first terminal end.

12. The optic assembly of claim 1, wherein the carrier and the carrier lift are slotted or wedged together.

13. The optic assembly of claim 12, wherein one of a top of the carrier lift and an underside of the carrier includes a channel to slottingly receive the other of the top of the carrier lift and the underside of the carrier.

14. An optic assembly, comprising:
an optic sight including at least a front lens and a housing, wherein a line of sight extends through the optic sight, including through the at least the front lens;
a carrier assembly including a light source, the light source to project a reticle on the front lens;
at least one boss fixably located with respect to the housing;
wherein the carrier assembly includes a first body and a second body, and the light source is mounted on the first body;
wherein a portion of the carrier assembly is positioned underneath a point along the line of sight and no portion of the housing is located between said portion of the carrier assembly and said point;
means for driving, with respect to the housing, sliding movement of the first body relative to a first surface or side of the second body of the carrier assembly; and
means for driving, with respect to the housing, slidingly movement of a second surface or side of the second body along the at least one boss.

15. The optic assembly of claim 14, wherein the at least one boss comprises a ramp.

16. The optic assembly of claim 14, further comprising an angled face on the at least one boss or the second surface or side of the carrier assembly, wherein the angled face has a linear or non-linear slope.

17. An optic assembly, comprising:
an environmentally isolated cavity defined by at least a front lens and a housing;
a light source located inside the environmentally isolated cavity, the light source to project a reticle on the front lens;
at least one boss fixably located with respect to a bottom interior surface of the environmentally isolated cavity;
a carrier assembly located inside the environmentally isolated cavity, wherein the light source is mounted on a first body of the carrier assembly;
means for externally driving, with respect to the environmentally isolated cavity, sliding movement of the first body relative to a first surface or side of a second body of the carrier assembly; and
means for externally driving, with respect to the environmentally isolated cavity, slidingly movement of a second surface or side of the second body along the at least one boss;
wherein the first body defines a channel to slottingly receive an end of the means for externally driving sliding movement of the first body relative to the first surface or side of the second body, and wherein the carrier assembly defines a channel to slottingly receive an end of the means for externally driving sliding movement of the second surface or side of the second body along the at least one boss.

18. The optic assembly of claim 14, further comprising means for urging the first body against an end of the means for driving sliding movement of the first body relative to the first surface or side or the second body.

19. An optic assembly, comprising:
an environmentally isolated cavity defined by at least a front lens and a housing;
a light source located inside the environmentally isolated cavity, the light source to project a reticle on the front lens;
at least one boss fixably located with respect to a bottom interior surface of the environmentally isolated cavity;
a carrier assembly located inside the environmentally isolated cavity, wherein the light source is mounted on a first body of the carrier assembly;
means for externally driving, with respect to the environmentally isolated cavity, sliding movement of the first body relative to a first surface or side of a second body of the carrier assembly; and
means for externally driving, with respect to the environmentally isolated cavity, slidingly movement of a second surface or side of the second body along the at least one boss;
a spring-biased part to urge the first body against an end of the means for externally driving sliding movement of the first body relative to the first surface or side of the second body;
wherein the first body includes a channel to slottingly receive an end of the spring-biased part.

20. The optic assembly of claim 19, wherein the end of the spring-biased part comprises a conical end.

21. The optic assembly of claim 14, wherein both of the means for external driving are located on a same side of the optic assembly or have a same longitudinal position.

22. The optic assembly of claim 17, wherein the slidingly movement of the second surface or the side of the second body along the at least one boss is in a lateral direction,
wherein a distance from the light source to the front lens remains constant as the second surface or the side of the second body makes the sliding movement along the at least one boss.

23. The optic assembly of claim 19, wherein a fore/aft position of the light source remains constant during 1) sliding movement of the first body relative to the first surface or the side of the second body of the carrier assembly, and 2) sliding movement of the second surface or the side of the second body along the at least one boss.

24. The optic assembly of claim 1, wherein a fore/aft position of the light source remains constant during 1) sliding movement of the first body relative to the first surface or the side of the second body of the carrier assembly, and 2) sliding movement of the second surface or the side of the second body along the at least one boss.

* * * * *